US007812472B2

(12) United States Patent
Allaei (10) Patent No.: US 7,812,472 B2
(45) Date of Patent: Oct. 12, 2010

(54) POWER GENERATING SKIN STRUCTURE AND POWER GENERATION SYSTEM THEREFOR

(75) Inventor: Daryoush Allaei, Minnetonka, MN (US)

(73) Assignee: Quality Research, Development & Consulting, Inc., Chaska, MN (US)

( * ) Notice: Subject to any disclaimer, the term of this patent is extended or adjusted under 35 U.S.C. 154(b) by 0 days.

(21) Appl. No.: 12/546,882

(22) Filed: Aug. 25, 2009

(65) Prior Publication Data

US 2010/0133849 A1      Jun. 3, 2010

(51) Int. Cl.
    *B60K 1/00*      (2006.01)
(52) U.S. Cl. ...................................................... 290/44
(58) Field of Classification Search .................. 290/55, 290/44
    See application file for complete search history.

(56) References Cited

U.S. PATENT DOCUMENTS

| | | | | |
|---|---|---|---|---|
| 5,874,798 A * | 2/1999 | Wiegele et al. | ............. | 310/168 |
| 6,201,314 B1 * | 3/2001 | Landry | ......................... | 290/54 |
| 6,239,501 B1 * | 5/2001 | Komarechka | ............... | 290/1 R |
| 6,590,363 B2 * | 7/2003 | Teramoto | .................... | 320/101 |
| 6,897,575 B1 * | 5/2005 | Yu | .............................. | 290/44 |
| 6,955,049 B2 | 10/2005 | Krouse | | |
| 6,987,329 B1 * | 1/2006 | Smith et al. | ..................... | 290/2 |
| 7,067,104 B2 * | 6/2006 | Sandhage | ................. | 423/592.1 |
| 7,492,053 B2 * | 2/2009 | Fein et al. | ...................... | 290/44 |
| 7,498,684 B2 * | 3/2009 | Fein et al. | ...................... | 290/44 |
| 7,501,713 B2 * | 3/2009 | Fein et al. | ...................... | 290/44 |
| 7,547,984 B2 * | 6/2009 | Fein et al. | ...................... | 290/44 |
| 7,566,980 B2 * | 7/2009 | Fein et al. | ....................... | 290/2 |
| 7,576,444 B2 * | 8/2009 | Fein et al. | ...................... | 290/44 |
| 7,637,112 B2 * | 12/2009 | Vanden Bussche et al. | ... | 62/50.2 |
| 7,661,562 B2 * | 2/2010 | Tyrrell et al. | ............. | 222/146.5 |
| 7,665,460 B2 * | 2/2010 | Lindsay et al. | ......... | 128/200.14 |
| 2005/0029903 A1 * | 2/2005 | Tadayon et al. | ............. | 310/314 |
| 2005/0179339 A1 * | 8/2005 | Pinkerton et al. | ........... | 310/309 |
| 2005/0180845 A1 * | 8/2005 | Vreeke et al. | ................. | 415/90 |
| 2006/0283712 A1 * | 12/2006 | Cohen | ........................ | 205/118 |
| 2008/0095621 A1 * | 4/2008 | Chi | ............................... | 416/9 |

FOREIGN PATENT DOCUMENTS

EP         1 845 257 A2    10/2005
WO    WO 8803603 A1 *    5/1988

OTHER PUBLICATIONS www.autobloggreen.com/photos/rormaxx/1263571, "RORMaxx Automotive", Jan. 6, 2009, pp. 2.
www.earthtronics.com, "WT6000 Wind Turbine Gearless Blade Tip Power System", Apr. 2009, pp. 2.

(Continued)

*Primary Examiner*—Joseph Waks
(74) *Attorney, Agent, or Firm*—Leffert Jay & Polglaze, P.A.

(57) ABSTRACT

A skin structure has a skin and a power generation system attached to the skin. The power generation system has a turbine, one or more tubes fluidly coupled to the turbine, and a generator configured to generate electrical power in response to motion of the turbine. The skin structure may form a portion of an outer covering of a stationary structure, such as a building, or an outer covering of a manned or unmanned vehicle, such as a ground or aerial motor vehicle or a marine or submarine motor vehicle.

20 Claims, 9 Drawing Sheets

OTHER PUBLICATIONS

Allaei, "Turbine-Intake Tower For Wind Energy Conversion Systems", U.S. Appl. No. 12/369,949, filed Feb. 12, 2009, pp. 26.

Allaei, "Kinetic Hydropower Generation System And Intake Therefore", U.S. Appl. No. 12/466,840, filed May 15, 2009, pp. 30.

* cited by examiner

POWER GENERATING SKIN STRUCTURE AND POWER GENERATION SYSTEM THEREFOR

CROSS REFERENCE TO RELATED APPLICATIONS

This application is related to U.S. patent application Ser. No. 12/466,840 (pending), filed May 15, 2009, titled "KINETIC HYDROPOWER GENERATION SYSTEM AND INTAKE THEREFORE," which is a continuation in part of U.S. patent application Ser. No. 12/369,949 (pending), filed Feb. 12, 2009, titled "TURBINE-INTAKE TOWER FOR WIND ENERGY CONVERSION SYSTEMS," both of which applications are commonly assigned and both of which applications are incorporated, in their entirety, herein by reference.

FIELD

The present disclosure relates generally to power generation and, in particular, the present disclosure relates to power generating skin structures.

BACKGROUND

Conversion of the kinetic energy of a flowing fluid, such as air (wind) or water, into electrical power is an attractive method for producing electrical power. This typically involves directing the flowing fluid through a turbine. The flowing fluid causes the turbine to rotate an electrical generator, causing the electrical generator to produce electrical power.

Examples of systems that convert the kinetic energy of flowing fluids into electrical power include wind energy conversion systems and kinetic hydropower generation systems. Kinetic hydropower generation systems typically involve submerging a turbine under water and directing flowing water current, e.g., due to waves, tides, etc., through the turbine.

Wind energy conversion systems typically include a wind turbine and an electrical generator mounted atop a tower and are typically large and noisy. Such systems are not well suited for producing power, such as supplemental power, for individual residences, especially in residential areas. Some wind energy conversion systems involve placing a wind turbine on a roof of residential or commercial buildings. However, these turbines are susceptible to storm damage and may require additional support structure to be added to the building to support the weight of the turbine.

The kinetic energy of fluid flow relative to bodies moving through a fluid environment can also be converted into electrical power. For example, the kinetic energy of air relative to moving ground and aerial (manned or unmanned) motor vehicles and of water relative to moving marine and submarine (manned or unmanned) motor vehicles can be used to generate electrical power for use by the respective vehicle. However, mounting a turbine on the exterior of a motor vehicle is impractical in that a turbine produces noise, vibration, and added drag, and is not esoterically appealing. Moreover, using ducting that has relatively large openings at the front of a motor vehicle to direct the fluid flow to one or more turbines within an interior of a motor vehicle can result in additional drag on the vehicle.

For the reasons stated above, and for other reasons stated below which will become apparent to those skilled in the art upon reading and understanding the present specification, there is a need in the art for alternatives to existing systems for converting kinetic energy of flowing fluids into electricity.

SUMMARY

An embodiment of the present invention provides a skin structure. The skin structure has a skin and a power generation system attached to the skin. The power generation system has a turbine, one or more tubes fluidly coupled to the turbine, and a generator configured to generate electrical power in response to motion of the turbine.

DETAILED DESCRIPTION

In the following detailed description of the present embodiments, reference is made to the accompanying drawings that form a part hereof, and in which are shown by way of illustration specific embodiments that may be practiced. These embodiments are described in sufficient detail to enable those skilled in the art to practice disclosed subject matter, and it is to be understood that other embodiments may be utilized and that process, electrical or mechanical changes may be made without departing from the scope of the claimed subject matter. The following detailed description is, therefore, not to be taken in a limiting sense, and the scope of the claimed subject matter is defined only by the appended claims and equivalents thereof.

Figure 1:
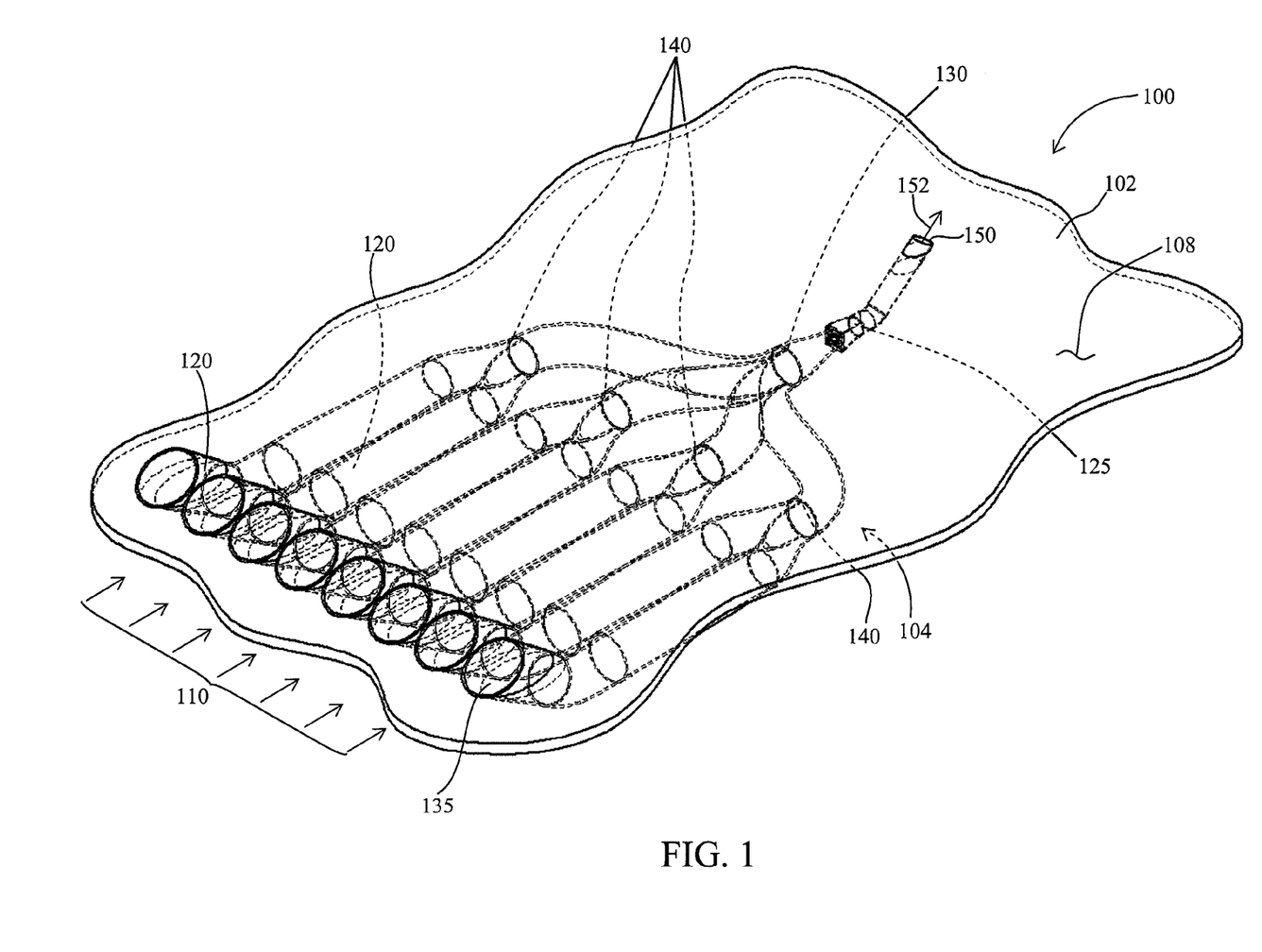
FIG. 1 is a perspective view of an exterior of an embodiment of a skin structure, according to an embodiment of the present invention.
Figure 2:
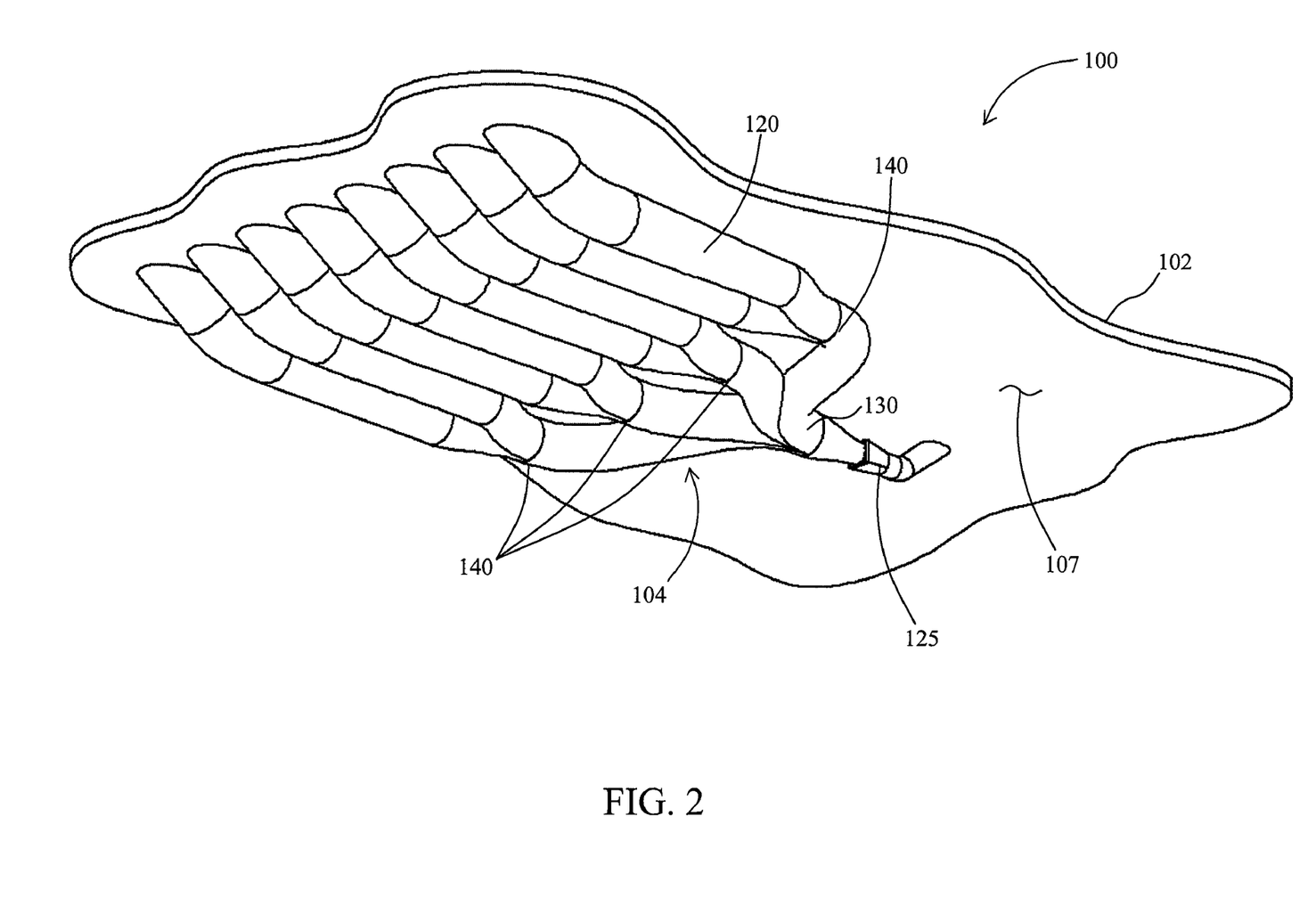
FIG. 2 is a perspective view of an interior of the skin structure of FIG. 1.

FIG. 1 is a perspective view of an exterior of a skin structure 100, according to an embodiment. FIG. 2 is a perspective view of an interior of skin structure 100. Skin structure 100 may include a skin 102. For one embodiment, skin 102, and thus skin structure 100, may form a portion of an outer covering of a stationary structure, such as a roof and/or sides of a building. As such, an interior surface 107 (FIG. 2) of skin 102, and thus skin structure 100, may form a portion of an interior surface of the stationary structure, and an exterior surface 108 (FIG. 1) of skin 102, and thus skin structure 100, may form a portion of an exterior surface of the stationary structure.

For another embodiment, skin 102, and thus skin structure 100, may form a portion of an outer covering of a vehicle, such as a ground or aerial (manned or unmanned) motor vehicle, e.g., an automobile, airplane, etc., or a marine or submarine (manned or unmanned) motor vehicle, e.g. a boat, submarine, etc. As such, interior surface 107 of skin 102, and thus skin structure 100, may form a portion of an interior surface of the vehicle, and exterior surface 108 of skin 102, and thus skin structure 100, may form a portion of an exterior surface of the vehicle.

Skin structure 100 includes a power generation system 104 attached to the skin and located on an interior side of skin 102. Power generation system 104 converts kinetic energy of a fluid-flow 110, e.g., a water-flow or airflow, moving relative to and over exterior surface 108 of skin 102, and thus of skin structure 100, as shown in FIG. 1. For example, the fluid flow may be substantially parallel to exterior surface 108. Note that the portion of power generation system 104 that is located on the interior side of skin structure 100 is hidden from view in FIG. 1 and is thus shown using dashed lines in FIG. 1.

Fluid-flow 110 may be wind moving past skin structure 100 when skin structure 100 is stationary, such as when skin structure 100 forms an outer covering of a stationary structure. Alternatively, fluid-flow 110 may be an airflow or water-flow relative to a vehicle moving through air or water. As such, fluid-flow 110 may be termed a forced fluid-flow.

Power generation system 104 has one or more tubes 120 on the interior side of skin 102 that are communicatively (e.g., fluidly) coupled to a turbine of a turbine/generator 125 formed on the interior side of skin 102. For example, power generation system 104 may include a manifold 130 that is interposed between turbine/generator 125 and a plurality of tubes 120 and that communicatively couples the plurality of tubes 120 to the turbine of turbine/generator 125, as shown in FIGS. 1 and 2. For one embodiment, pairs of tubes 120 may be coupled to a manifold 140 interposed between manifold 130 and tubes 120. Each manifold 140 communicatively couples its pair of tubes 120 to manifold 130.

Each of tubes 120 has an inlet 135 that opens on the exterior side of skin structure 100. For one embodiment, inlet 135 may have circular cross-section having a diameter on the order of one micron or one nanometer. As such, tubes 120 may be referred to as micro-tubes or nano-tubes, and power generation system 104 may be referred to as a micro-power-generation-system or a nano-power-generation-system. Note that the size of the micro-tubes or nano-tubes is exaggerated in FIGS. 1 and 2 and may be several orders of magnitude less that the thickness of skin 102 for some embodiments.

During operation, fluid-flow 110 enters tubes 120 though inlets 135. The respective tubes 120 direct their respective flows to the turbine turbine/generator 125. For example, pairs of tubes 120 direct their respective flows to a respective manifold 140. Each manifold 140 combines the flows from the respective pair of tubes 120 and directs the combined flow to manifold 130. Manifold 130 combines the flows from the respective manifolds 140 and directs the combined flow to the turbine of turbine/generator 125. As such, the turbine receives the flow flowing through each of tubes 120.

The flow subsequently flows through the turbine, causing the turbine to rotate. The generator of turbine/generator 125 generates electrical power in response to the rotation of the turbine. That is, the generator converts the rotation of the turbine into electrical power.

The flow exits the turbine, and thus power system 104, through an outlet 150. That is, an outlet of the turbine is fluidly coupled to outlet 150. Outlet 150 may be located on and may open on the exterior side of skin structure 100, and the flow 152 exiting power system 104 through outlet 150 may be returned to the flow 110, as shown in FIG. 1. Alternatively, outlet 150 may be located on and open on the interior side of skin structure 100 so that the flow 152 exiting power system 104 through outlet 150 is directed away from skin structure 100. For another embodiment, outlet 150 may be located in a portion of the stationary structure or vehicle that is not exposed to fluid-flow 110.

For one embodiment, a stationary structure or vehicle may have a plurality of power systems 104. For this embodiment, the power from each power system 104 may be directed to a battery, for example, for storage, such as for auxiliary power, to reduce the power demand of an engine of a motor vehicle, or to reduce the power that needs to be purchased to power a stationary structure, such as a building.

Figure 3:
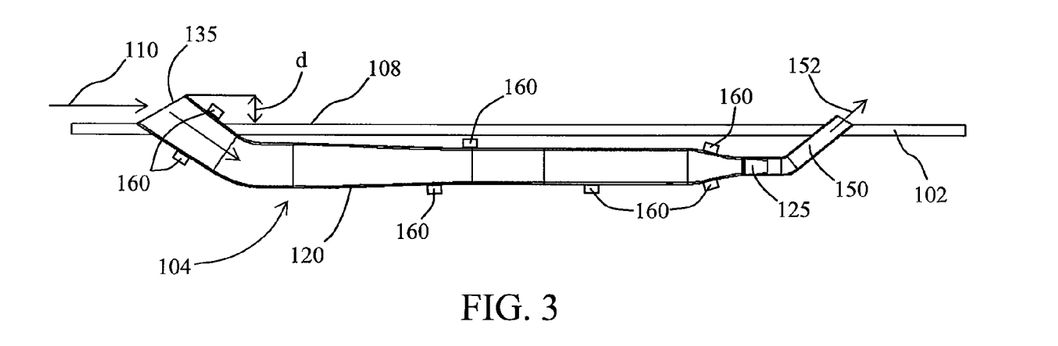
FIG. 3 is a cross-sectional view of a portion of an embodiment of a power system of a skin structure, according to another embodiment of the present invention.

FIG. 3 is a cross-sectional view of a portion of power system 104, according to another embodiment. As shown, the flow passage within each tube 120 may be tapered and may converge along the length of the tube from the inlet 135 to turbine/generator 125. That is, the cross-sectional area (perpendicular to the flow direction) of the flow passage within each tube 120 decreases from the inlet 135 to the turbine/generator 125.

Passing the flow through a tube 120 causes the flow to converge and thus accelerate. That is, each tube 120 receives fluid-flow 110 and accelerates fluid-flow 110. For embodiments, where manifolds 130 and 140 are used, manifolds 130 and 140 may also have converging flow passages that act to accelerate the flows received thereat. The accelerated flow is delivered to the turbine. Note that the flow velocity within tubes 120, manifold 130, and manifolds 140, may be further increased, e.g., thermally assisted, by a temperature difference that may occur between the exterior and interior sides of skin structure 100, e.g., between the inlets 135 and the inlet to the turbine.

The increased flow velocity at the inlet to the turbine allows for shorter turbine blades. For example, the power output of some turbines is proportional to the cubic order of the turbine inlet velocity and is typically proportional to the square of the blade length. This means that since the power output of a turbine is proportional to the cubic order of the turbine inlet velocity and is proportional to the square of the blade length, the turbine can have shorter blades and still have a higher power output.

Shorter blades result in less drag than longer blades and thus result in less energy loss than longer blades. Shorter blades result in lower material costs, installation costs, and maintenance costs compared to longer blades. The shorter blades are less susceptible to defects and failure, take up less space, and generate less noise and vibration than longer blades.

As shown in FIGS. 1 and 3, the inlet 135 of each tube 120 may extend above exterior surface 108 of skin 102, e.g., at an angle to exterior surface 108. The distance d by which the inlet 135 of each tube 120 extends above exterior surface 108 may be on the order of one micron or one nanometer, so as to not to significantly increase drag. Angling the inlet 135 of each tube 120, as shown in FIGS. 1 and 3, enables the inlet 135 to capture a portion of fluid-flow 110 and to direct that portion of fluid-flow 110 into the respective tube 120. The outlet 150 of each tube may also extend above exterior surface 108 of skin 102, e.g., at an angle to exterior surface 108, by a distance on the order of one micron or one nanometer, so as to not to significantly increase drag.

Figure 4:
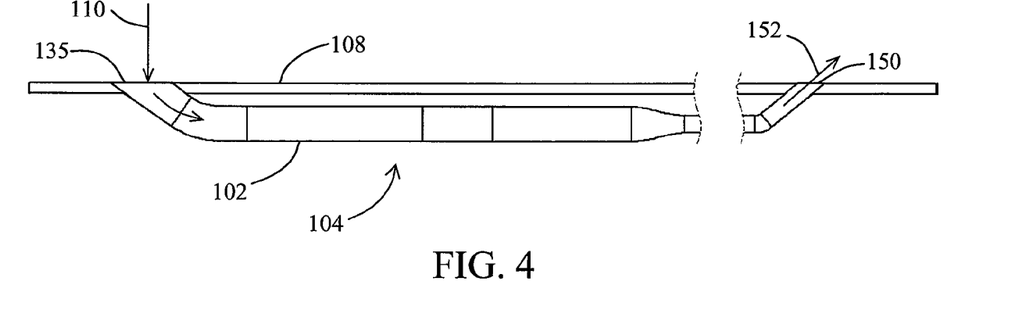
FIG. 4 is a cross-sectional view of a portion of another embodiment of a power system of a skin structure, according to another embodiment of the present invention.

Alternatively, inlet 135 and outlet 150 may be flush (e.g., substantially flush) with exterior surface 108, as shown in the cross-sectional view of FIG. 4. The fluid-flow 110 in the configuration of FIG. 4 may be parallel (e.g., substantially parallel) to exterior surface 108 or may be perpendicular (e.g., substantially perpendicular) to exterior surface 108, as shown in FIG. 4. Note that the outlet 150 in the configuration of FIG. 4 may be located in a portion of the stationary structure or vehicle that is not exposed to fluid-flow 110, as indicated by the break in FIG. 4.

Micro-actuators or nano-actuators 160 may be coupled in physical contact with the outer surface of each tube 120, as shown in FIG. 3, and in physical contact with the outer surface manifold 130 and of manifolds 140. Actuators 160 are electrically coupled to a controller (not shown) for receiving electrical signals therefrom.

For example, a flow-velocity sensor (not shown), e.g., of skin structure 100, the vehicle, or the stationary structure, might detect a flow velocity of fluid-flow 110 and send a signal indicative of the flow velocity to the controller. For some embodiments, the flow-velocity sensor may sense the velocity of fluid-flow 110 relative to exterior surface 108 of skin structure 100. For example, the velocity of fluid-flow 110 may be the wind speed or the velocity of the vehicle that includes skin structure 100. The flow-velocity sensor may be a micro- or nano-sensor.

The controller may apply a voltage to actuators 160, causing the actuators to adjust a shape of the tubes 120, e.g., the diameters of the tubes 120, and/or the shape of manifold 130, e.g., the diameter of manifold 130, and/or the shapes of manifolds 140, e.g., the diameters of manifolds 140, to produce a certain flow velocity at the inlet to the turbine. The controller may also cause the actuators to adjust the diameters of the tubes 120 and/or manifold 130 and/or manifolds 140 to reduce flow losses based on a detected flow velocity of fluid-flow 110. This is similar to control and operation of the actuators in U.S. patent application Ser. No. 12/466,840 and U.S. patent application Ser. No. 12/369,949, which show and describe actuators, flow-velocity sensors, and controllers.

Figure 5:
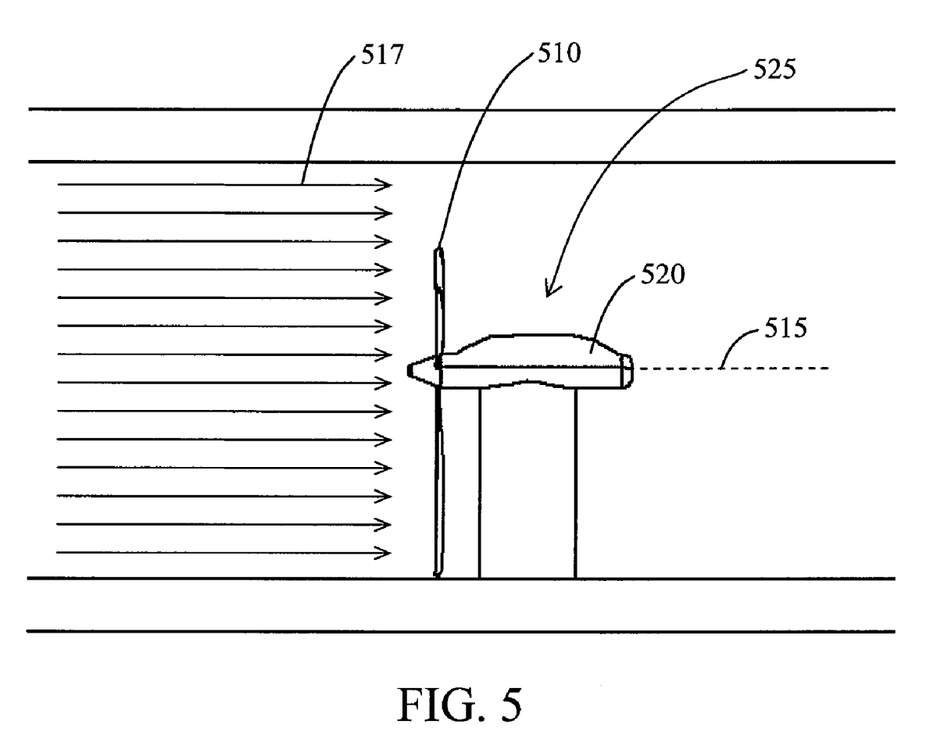
FIG. 5 illustrates an embodiment of a turbine/generator of a power system of a skin structure, according to another embodiment of the present invention.

FIG. 5 illustrates a turbine/generator 525 that may be used for turbine/generator 125 of power system 104 for one embodiment. For example, turbine/generator 525 may include an axial-flow turbine 510 having blades that rotate about a rotational axis 515 that is parallel (e.g., substantially parallel) to the fluid-flow 517, e.g., exiting manifold 130, at the inlet to turbine 510. After the flow flows past turbine 510, it is directed out of power system 104 through outlet 150 (FIGS. 1 and 3).

An electrical generator 520, such as a 60 Hz AC generator, is coupled (e.g., mechanically coupled) to turbine 120 via a shaft and suitable transmission. For water applications, electrical generator 520 is suitably waterproofed to protect against electrical shorting and corrosion. Alternatively, electrical generator 520 may be located out of the fluid-flow, and the shaft and transmission may convey the rotation to the location of electrical generator 520.

For one embodiment, the size of turbine/generator 525 may be on the order of one micron or one nanometer, and may be referred to as a micro- or nano-turbine/generator. For example, turbine 510 may be a micro- or nano-turbine and have a rotor diameter (e.g., blade tip-to-tip distance) on the order of one micron or one nanometer, and generator 520 may be a micro- or nano-generator and have a size on the order of one micron or one nanometer.

During operation, fluid-flow 517 causes turbine 510 to rotate. The rotation is transferred to generator 520, via the shaft and transmission, thereby causing generator to rotate and generate electrical power.

Figure 6:
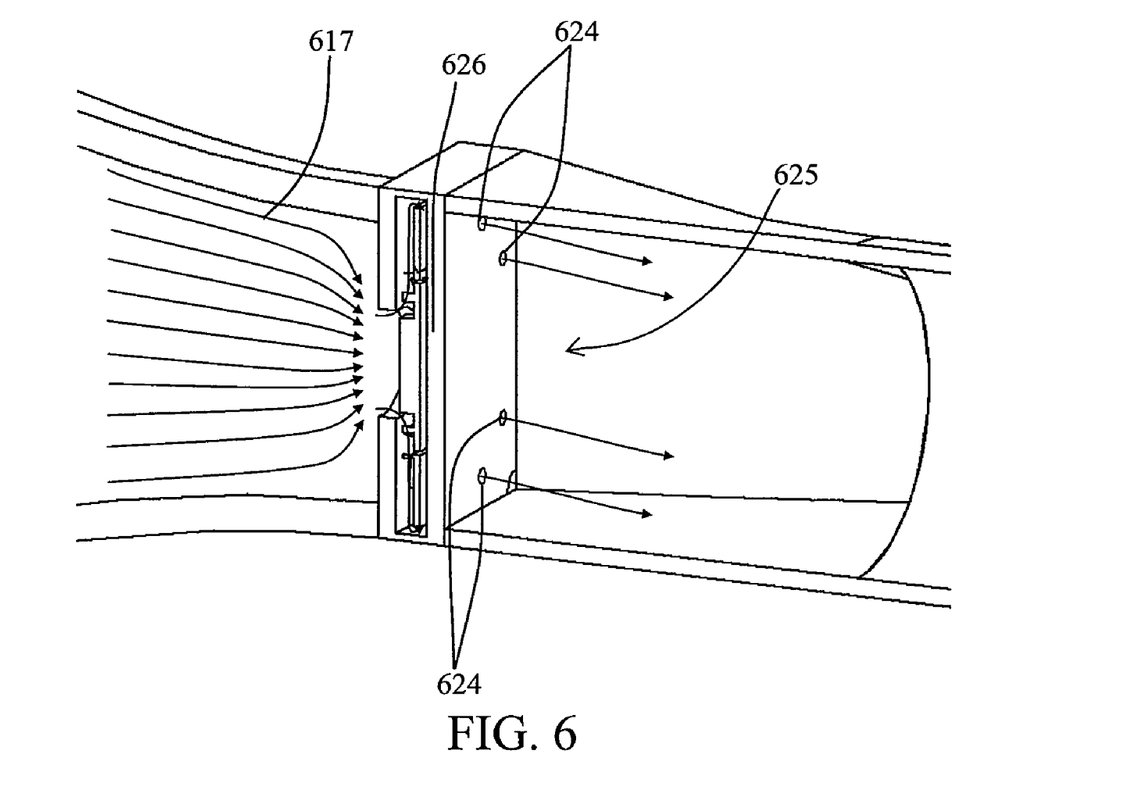
FIG. 6 illustrates another embodiment of a turbine/generator of a power system of a skin structure, according to another embodiment of the present invention.
Figure 7:
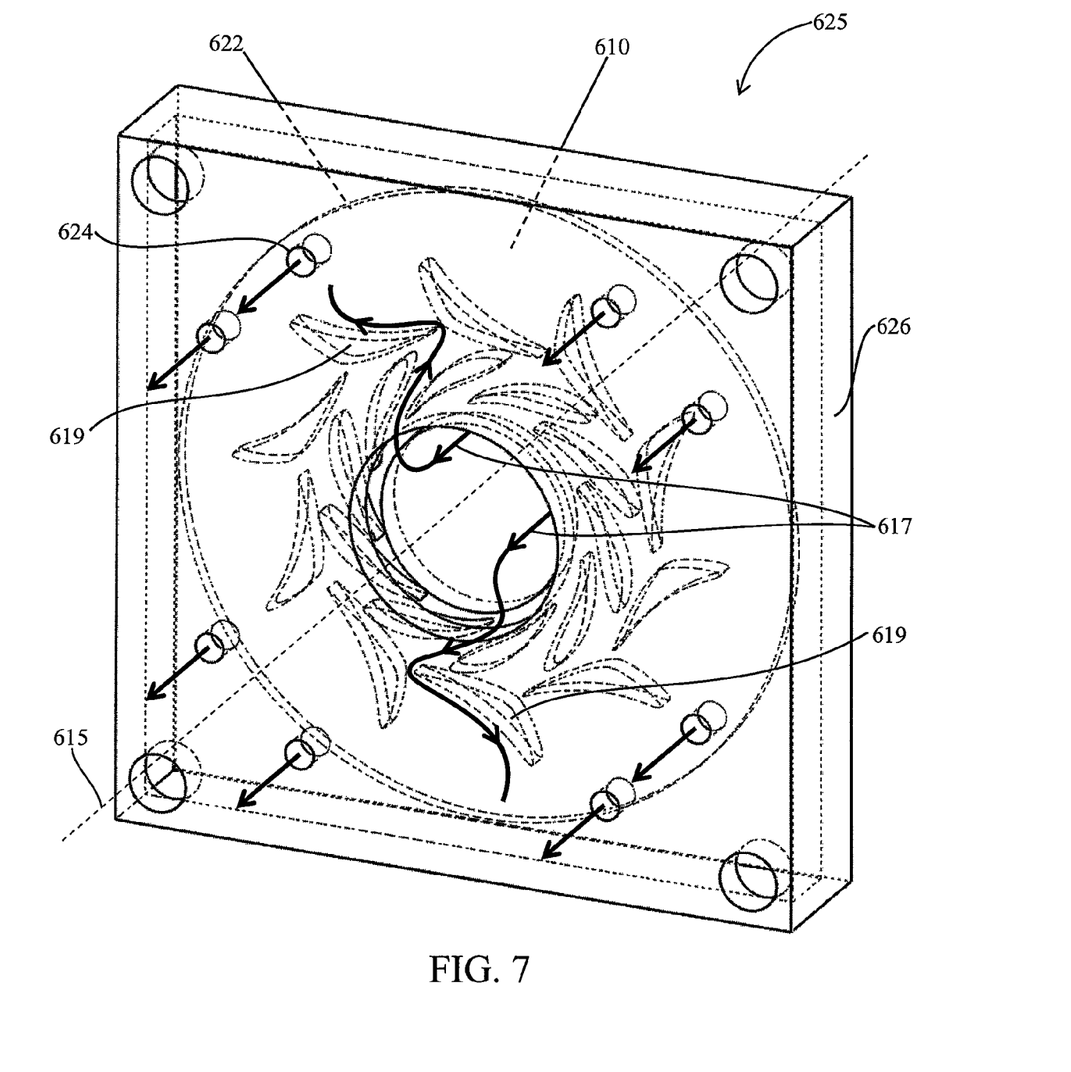
FIG. 7 illustrates an embodiment of a turbine of the turbine/generator of FIG. 6.

FIGS. 6 and 7 illustrate a turbine/generator 625 that may be used for turbine/generator 125 of power system 104 for another embodiment. For example, turbine/generator 625 may include a radial-flow turbine 610 that rotates about a rotational axis 615 (FIG. 7) that is parallel (e.g., substantially parallel) to the fluid-flow 617 (FIGS. 6 and 7), e.g., exiting manifold 130, at the inlet to turbine 610. After entering turbine 610, fluid-flow 617 turns by about 90 degrees and flows with radial-outward component over turbine blades 619 away from rotational axis 615 and toward a periphery 622 of turbine 610, as shown in FIG. 7. At the periphery 622, the flow turns by about 90 degrees and flows parallel (e.g., substantially parallel) to axis 615.

The flow exits turbine 610, in a direction parallel (e.g., substantially parallel) to axis 615, through outlets 624 that are formed in a stationary housing 626 that houses turbine 610 and that are located around the periphery 622, as shown in FIGS. 6 and 7. The flow is then directed out of power system 104 through outlet 150 (FIGS. 1 and 3). Note that turbine 610 is located within housing 626 and is hidden from view in FIG. 7 and is thus shown using dashed lines in FIG. 7.

For one embodiment, stationary housing 626 may include a stationary electrical generator (not shown) that generates electrical power from the motion of the tips of blades 619 of turbine 610 or the motion of the periphery 622 of turbine 610 in a manner similar to the WT6000 Wind Turbine Gearless Blade Tip Power System developed by HONEYWELL International, Inc. (Morristown, N.J.). For water applications, the electrical generator is suitably waterproofed to protect against electrical shorting and corrosion. Alternatively, turbine 610 may be coupled to an electrical generator by a shaft and suitable transmission in a manner similar to that described above in conjunction with electrical generator 520.

For one embodiment, the size of turbine/generator 625 may be on the order of one micron or one nanometer, and may be referred to as a micro- or nano-turbine/generator. For example, turbine 610 may have a diameter on the order of one micron or one nanometer and may be referred to as a micro- or nano-turbine.

Figure 8:
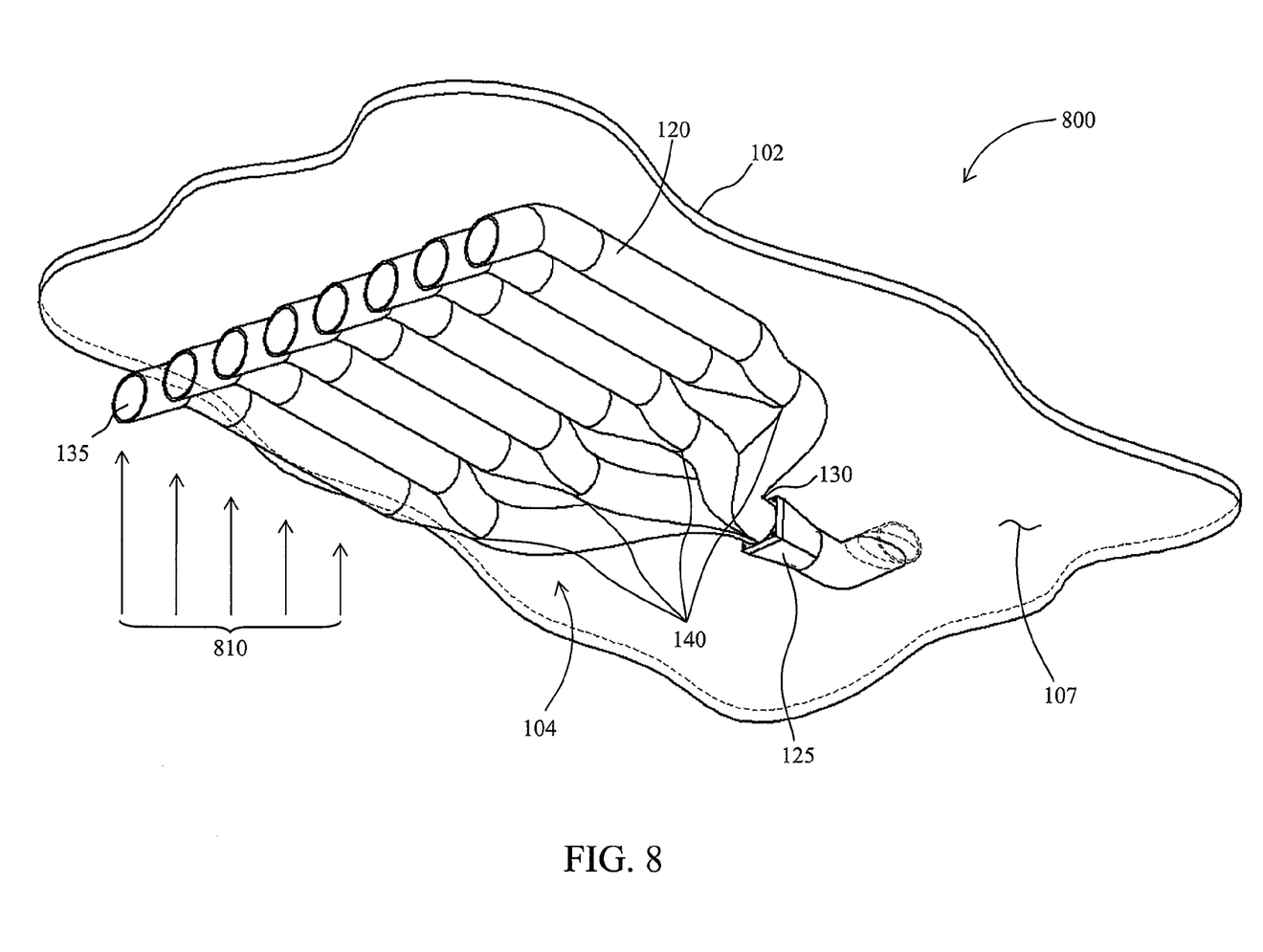
FIG. 8 is a perspective view of an interior of another embodiment of a skin structure, according to another embodiment of the present invention.

FIG. 8 is a perspective view of an interior of a skin structure 800, according to another embodiment. Common reference numbers are used in FIG. 8 and FIGS. 1-3 to identify the same or substantially similar components. Skin structure 800 may include the skin 102 described above in conjunction with FIGS. 1-3. The power generation system 104, described above in conjunction with FIGS. 1-3, is located on the interior side of skin structure 800, with the inlets 135 of tubes 120 located on the interior side of skin structure 800.

The temperature of a fluid, such as water or air, on the interior side of skin structure 800 is greater than the temperature of the fluid on the exterior side of skin structure 800. For example, skin structure 800 may form a portion of an outer covering of a stationary structure, such as a roof of a building, where the interior of the building is at a higher temperature than the exterior. As such, interior surface 107 (FIGS. 8 and 9) of skin 102, and thus skin structure 800, may form a portion of an interior surface of the stationary structure, and exterior surface 108 (FIG. 9) of skin 102, and thus skin structure 800, may form a portion of an exterior surface of the stationary structure.

Figure 9:
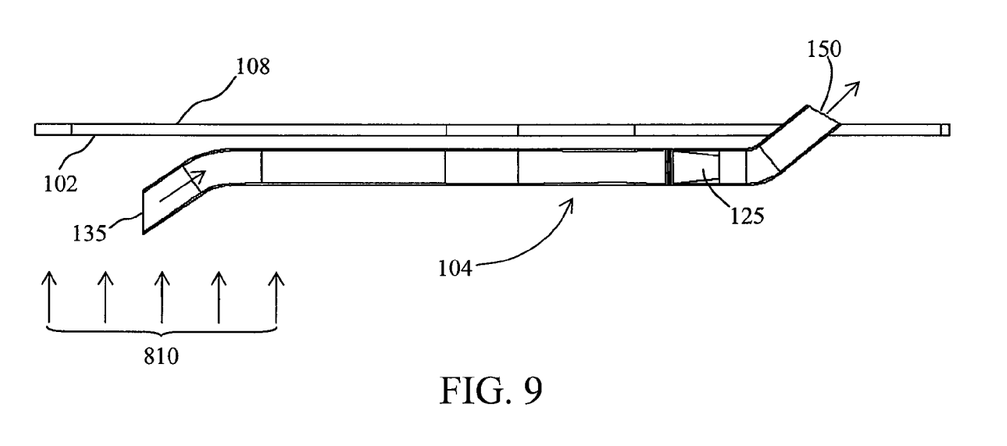
FIG. 9 is a cross-sectional view of a portion of a power system of the skin structure of FIG. 8, according to another embodiment of the present invention.

Skin structure 800 may form a portion a covering (e.g., a hood) of an engine compartment of a motor vehicle, where the interior of the engine compartment is at a higher temperature than the exterior of the motor vehicle. For example, interior surface 107 of skin 102, and thus skin structure 800, may form a portion of an interior surface of the engine compartment, and exterior surface 108 of skin 102, and thus skin structure 800, may form a portion of an exterior surface of the engine compartment.

The temperature difference between the interior and exterior produces a fluid-flow 810 on the interior side of skin structure 800 that enters tubes 120 through their respective inlets 135, as shown in FIG. 9, a cross-sectional view of a portion of power system 104. That is, the flow 810 is a thermally driven flow. Note that inlets 135 open on the interior side of skin structure 800 and thus open to an interior of the stationary structure or the vehicle.

The fluid flows through each tube 120, into the respective manifolds 140 (FIG. 8), and into manifold 130, as described above in conjunction with FIGS. 1 and 2. The flow subsequently flows through the turbine of turbine generator 125, causing the turbine to rotate. The generator of turbine/generator 125 generates electrical power in response to the rotation of the turbine. The flow exits the turbine, and thus power system 104, through outlet 150 on the exterior side of skin 102, and thus of skin structure 800. That is, an outlet of the turbine may be fluidly coupled to the exterior side of skin 102.

Note that turbine/generator 125 may be the same (e.g., substantially the same) as turbine/generator 525, discussed above in conjunction with FIG. 5. Alternatively, turbine/generator 125 may be the same (e.g., substantially the same) as turbine/generator 625, discussed above in conjunction with FIGS. 6-7.

Note that power system 104, and thus skin structure 800, directs the relatively warm fluid from the interior side to the exterior side while generating electrical power. This acts to ventilate the interior of the stationary structure, such as a warm attic under a roof during the summer, or the interior of a motor vehicle, such as the engine compartment of the motor vehicle. That is, skin structure 800 provides cooling while producing electrical power.

For one embodiment, skin structure 100 and skin structure 800 may be used together on a stationary structure or a motor vehicle.

CONCLUSION

Although specific embodiments have been illustrated and described herein it is manifestly intended that the scope of the claimed subject matter be limited only by the following claims and equivalents thereof.

What is claimed is:

1. A skin structure, comprising:
   a skin; and
   a power generation system attached to the skin, the power generation system, comprising:
      a turbine;
      one or more tubes fluidly coupled to the turbine;
      a generator configured to generate electrical power in response to motion of the turbine; and
      an actuator coupled to at least one of the one or more tubes that can adjust a shape of the at least one of the one or more tubes.

2. The skin structure of claim 1, wherein the power generation system is a micro power generation system or a nano power generation system.

3. The skin structure of claim 1, wherein the turbine and generator are located on an interior side of the skin and an inlet to each of the one or more tubes opens on an exterior side of the skin.

4. The skin structure of claim 3, wherein each inlet is configured to capture a portion of a fluid-flow flowing relative to the skin on the exterior side of the skin and to direct the captured portion of the fluid-flow to the turbine.

5. The skin structure of claim 3, wherein each inlet is flush with an exterior surface of the skin or extends by a certain distance above the exterior surface of the skin.

6. The skin structure of claim 1, wherein the one or more tubes comprise a plurality of first tubes, and further comprising:
   a manifold fluidly coupled to the plurality of first tubes; and
   a second tube that fluidly couples the manifold to the turbine.

7. The skin structure of claim 1, wherein the skin is configured to form a portion of an outer covering of a stationary structure or of a vehicle.

8. The skin structure of claim 1, wherein a flow passage within each of the one or more tubes converges along the length of the tube from an inlet of the respective tube.

9. The skin structure of claim 1, further comprising:
   a controller electrically coupled to the actuator;
   wherein the controller is configured to send a signal to the actuator that causes the actuator to adjust the shape of the at least one of the one or more tubes based on a velocity of a fluid-flow relative to the skin structure.

10. The skin structure of claim 1, wherein the one or more tubes are configured to capture a thermally driven flow and direct the thermally driven flow to the turbine.

11. The skin structure of claim 1, wherein the turbine is an axial flow turbine or a radial flow turbine.

12. A skin structure, comprising:
   a skin configured to form a portion of an outer covering of a stationary structure or of a vehicle; and
   a power generation system attached to the skin, the power generation system, comprising:
      a turbine having an outlet fluidly coupled to an exterior side of the skin;
      a plurality of tubes fluidly coupled to the turbine, the tubes having inlets opening on an interior side of the skin, where a temperature on the interior side of the skin is higher than a temperature on the exterior side of the skin; and
      a generator configured to generate electrical power in response to motion of the turbine;
      wherein the inlets of the tubes are configured to capture a fluid-flow driven by a difference between the temperature on the interior side of the skin and the temperature on the exterior side of the skin and to direct the captured fluid-flow to the turbine.

13. The skin structure of claim 12, wherein the interior side of the skin corresponds to an interior of a motor vehicle or an interior of a stationary structure.

14. A method of generating electrical power using a skin structure, the method comprising:
   receiving a fluid-flow at an inlet of a tube of the skin structure that is attached to a skin of the skin structure, the inlet opening to an exterior of the tube;
   converging the fluid-flow through the tube from the inlet to a turbine of the skin structure through a converging flow passage of the tube that extends from the inlet to the turbine, the turbine attached to the skin and having an outlet fluidly coupled to an exterior side of the skin, wherein the fluid-flow causes the turbine to rotate; and
   converting the rotation of the turbine into electrical power using a generator of the skin structure that is attached to the skin of the skin structure.

15. The method of claim 14, further comprising adjusting a shape of the tube using an actuator attached to the tube based on a velocity of the fluid-flow relative to the skin structure.

16. The method of claim 14, wherein receiving the fluid-flow at the inlet of the tube comprises capturing a fluid-flow that is flowing on an exterior side the skin of the skin structure.

17. The method of claim 16, wherein the skin forms a portion of an outer covering of a stationary structure and the fluid-flow is wind.

18. The method of claim 16, wherein the skin forms a portion of an outer covering of a vehicle and the fluid-flow is airflow or water-flow relative to the vehicle as the vehicle moves through air or water.

19. The method of claim 16, wherein before receiving the fluid-flow at the inlet of the tube, the fluid-flow is substantially perpendicular to the skin.

20. The method of claim 14, wherein receiving the fluid-flow at the inlet of the tube comprises capturing a thermally driven fluid-flow that is flowing on an interior side the skin of the skin structure.

* * * * *